United States Patent [19]  
Burkhardt et al.

[11] 3,932,612  
[45] Jan. 13, 1976

[54] INSECTICIDAL COMPOSITIONS FOR SUSTAINED RELEASE OF 0,0-DIMETHYL-0-(2,2-DICHLOROVINYL) PHOSPHATE

[75] Inventors: Claus Burkhardt, Krefeld; Karl Raichle, Krefeld-Bockum; Wolfgang Behrenz, Cologne, all of Germany

[73] Assignee: Bayer Aktiengesellschaft, Leverkusen, Germany

[22] Filed: June 15, 1973

[21] Appl. No.: 370,512

[30] Foreign Application Priority Data  
June 24, 1972 Germany.............................. 2231099

[52] U.S. Cl. ...................... 424/78; 424/19; 424/32; 424/219
[51] Int. Cl.² ......................................... A01N 9/36
[58] Field of Search ........... 424/22, 19, 32, 33, 219, 424/78

[56] References Cited  
UNITED STATES PATENTS  
3,318,769  5/1967  Folckemer et al................. 424/219  
3,608,062  9/1971  Alfes et al........................... 424/22  
3,630,446  12/1971  Roth ..................................... 424/219

*Primary Examiner*—V. D. Turner  
*Attorney, Agent, or Firm*—Burgess, Dinklage & Sprung

[57] ABSTRACT

A molded article exhibiting sustained release gas action to combat insects, without incurring odor build-up, comprising the product of curing a composition comprising 0,0-dimethyl-0-(2,2-dichlorovinyl)phosphate, an ethylenically unsaturated polyester, a vinyl monomer copolymerizable with the polyester, at least one solid or liquid filler, and an ethylenically unsaturated compound of the formula

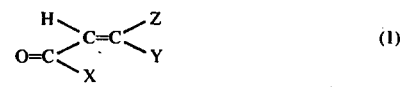

in which  
  X is —OR or —OH, Y is —H and Z is —COOR, or  
  X is —OH, Y is —COOR and Z is —H, or  
  X is —O— or >N-R, Y is >CO and Z is —H, in which case X and Y are bonded together to form an anhydride or imide ring, and  
R is an aliphatic radical with up to 12 carbon atoms. Desirably curing is effected in the presence of a peroxide of the formula

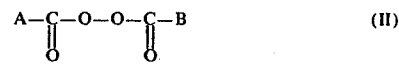

in which  
  A and B each is alkyl, aryl, aralkyl, alkoxy or aryloxy of 6 to 12 carbon atoms.

10 Claims, No Drawings

INSECTICIDAL COMPOSITIONS FOR SUSTAINED RELEASE OF 0,0-DIMETHYL-0-(2,2-DICHLOROVINYL) PHOSPHATE

The present invention relates to compositions comprising 0,0-dimethyl-0-(2,2-dichlorovinyl)phosphate (DDVP), an ethylenically unsaturated polyester, a vinyl monomer copolymerizable with the polyester, a solid filler and/or a liquid filler, and an additional ethylenically unsaturated compound; to a method of producing, from such compositions, moldings that have an insecticidal depot (sustained release) gas action; and to a method of combating insects using such moldings.

U.S. Patent Specification No. 3,608,062 discloses moldings containing DDVP, such as slabs, balls, strips, tablets, bars and hollow bodies, having a long-lasting insecticidal depot gas action, and based on cured products, containing solid and/or liquid fillers, of unsaturated polyesters and vinyl monomers copolymerizable therewith. To manufacture these moldings, a mixture, capable of flow, of the components mention is cured with the aid of radical-forming initiators, optionally in combination with suitable accelerators, according to processes which are in themselves known.

The action of these moldings as a depot gas insecticide is based on the constant release of the volatile active compound to the surrounding atmosphere. In this way an active-compound concentration which is insecticidally effective but non-toxic to man can be produced in a closed room for a period of about 12 to 16 weeks. The losses in active compound which occur as a result of saponification of the active compound and/or as a result of fresh air being admitted to the room are compensated by further active compound being supplied from the molding.

However, it is a noticeable disadvantage when using these prior-art moldings containing DDVP that, especially during the first days of use, an objectionable odor is diffused so that during this time the air in the room must be changed more frequently than usual. When doing this, the concentration of active compound falls below the optimum insecticidal dose, that is to say the insecticidal action of the moldings is transiently imparied.

The present invention provides a curable composition comprising 0,0-dimethyl-0-(2,2-dichlorovinyl)-phosphate (DDVP), an ethylenically unsaturated polyester, a vinyl monomer copolymerizable with the polyester, a solid filler and/or a liquid filler, and an ethylenically unsaturated compound of the general formula

in which
1. X is —OR or —OH, Y is —H, and Z is —COOR, or
2. X is —OH, Y is —COOR, and Z is—H, or
3. X is —O— or >N—R, Y is >CO, and Z is—H, in which case X and Y are bonded together to form an anhydride or imide ring, and
R is an aliphatic radical with up to 12 carbon atoms.

The compositions of this invention may be cured to form materials which exhibit an insecticidal depot gas action but which have only a low odor.

The present invention also provides a process for the production of a molding having an insecticidal depot gas action, which process comprises curing a composition as described with a peroxide of the general formula

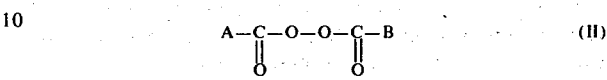

in which
A and B each is alkyl, aryl, aralkyl, alkoxy or aryloxy of 6 or 12 carbon atoms.

The curing can optionally be effected in the presence of an accelerator and/or under irradiation with high energy rays. A preferred peroxide compound (II) is benzoyl peroxide.

In the foregoing formulae (I) and (II) R is preferably alkyl such as dodecyl, cyclohexyl and even lower alkyl such as methyl. Preferred radicals A and B of the peroxides include benzoyl, halo-benzoyl, straight chain higher alkanoyl, cyclohexanoyl and oxy-carboalkoxy radicals.

The present invention also provides a method of combating insects in a confined space, which method comprises placing in the confined space a material or molding formed by curing a composition of this invention, whereby vaporized DDVP can diffuse throughout the confined space.

It is surprising that the compositions of this invention yield, on curing, moldings that have an insecticidal depot gas action but that do not suffer from the disadvantage of the above-mentioned prior-art moldings, namely a pronounced odor. The presence of the additional ethylenically unsaturated compounds (I) in the moldings according to the invention does not impair the release of active compound to the surrounding atmosphere.

Unsaturated polyesters which may be used in this invention are polyesters based on α, β-ethylenically unsaturated dicarboxylic acids and polyhydric alcohols such as are described, for example, in DAS (German Published Specification) 1,151,932 and DOS (German Published Specification) 1,694,240. They can contain customary inhibitors, for example hydroquinone, toluhydroquinone and 2,5-di-tert.-butylquinone. The weight ratio of active compound to the mixture of unsaturated polyester and vinyl monomers is about 1:4 to 2:1, preabout 1:3 to 1:1.

The unsaturated polyesters can be manufactured in a known manner by polycondensation of polyhydric alcohols, especially alkylene glycols, such as glycol, 1,2-propanediol, 1,3-butanediol and 2,2-dimethyl-1,3-propanediol, or polyglycols, such as diethylene glycol or triethylene glycol, dipropylene glycol or tripropylene glycol, with α, β-ethylenically unsaturated dicarboxylic acids or their anhydrides, such as fumaric acid or maleic acid or anhydride, optionally with the addition of aliphatic, cycloaliphatic or aromatic dicarboxylic acids or their anhydrides, such as phthalic acid or anhydride, isophthalic acid, succinic acid, adipic acid or sebacic acid.

Vinyl monomers which may be used in this invention are compounds possessing the grouping $CH_2=C<$, preferably vinylaromatic compounds, such as styrene or vinyltoluene. However, it is also possible to use vinyl compounds such as vinyl esters of lower alkanoic acids such as vinyl acetate and vinyl propionate, and vinyl benzoate, and also acrylic and methacrylic acid esters, especially lower alkyl esters such as butyl acrylate, methyl methacrylate, or acrylonitrile. The ratio of the unsaturated polyesters to the vinyl monomers can be from about 40:60 to 90:10 percent by weight.

Examples of the additional ethylenically unsaturated compounds (I) are maleic anhydride, maleic acid monoalkyl esters, such as maleic acid monododecyl ester, maleic acid monocyclohexyl ester and maleic acid monomethyl ester, fumaric acid monoalkyl esters and dialkyl esters, such as the monomethyl and dimethyl, monopropyl and dipropyl, monocyclohexyl and dicyclohexyl, and monododecyl and didodecyl esters of fumaric acid, or N-alkylmaleimides, such as N-dodecylmaleimide, N-cyclohexylmaleimide and N-butylmaleimide; maleic anhydride is preferred. They display their action at between about 0.1 and 10 percent by weight, preferably between about 0.5 and 5 percent by weight, relative to the mixture of unsaturated polyesters, vinyl monomers, DDVP, fillers and additional ethylenically unsaturated compounds (I).

Suitable fillers are inert solid fillers, such as fibers or fabrics of glass, sisal, hemp, nettle, coir, flax and other vegetable products or synthetic fibers, and also mineral fillers, such as titanium dioxide, ion oxides, kaolin and quartz. Suitable liquid fillers are those possessing a carrier action, such as phthalic acid esters, especially dioctyl phthalate, chlorinated paraffin, and alkylsulfonic acid aryl esters, such as $C_{10-18}$-alkylsulfonic acid phenyl esters. It is particularly advantageous to use the solid and liquid fillers in combination with one another. The proportion of the fillers in the moldings is about 10 to 50 percent by weight.

Suitable peroxides are, for example, benzoyl peroxide, 2,4-dichlorobenzoyl peroxide, lauroyl peroxide, nonanoyl peroxide, isononanoyl peroxide, decanoyl peroxide or bis-(4-tert.-butylcyclohexyl) peroxydicarbonate, α-ethylhexyl percarbonate, bis-(α-ethylhexyl) peroxydicarbonate, bis(cyclohexyl) peroxydicarbonate and p-chlorobenzoyl peroxide.

Possible accelerators are dialkylarylamines, for example N-dimethylaniline, N-(bishydroxyethyl)-aniline, N-(bis-hydroxypropyl)-aniline or N,N-methylethylaniline.

Curing may be effected according to processes which are in themselves known, optionally with external application of heat, at temperatures between about 40° and 120°C, and optionally under the action of high-energy rays, for example electron beams, ultra-violet rays, infra-red rays or laser beams. Curing can of course take place without such measures and even without the peroxide, although it will necessarily be much more slow.

In the Examples 1-4 which follow, a homogeneous mixture (premix) was in each case produced from 440 parts by weight of an unsaturated polyester (produced by polycondensation of 205.8 parts by weight of maleic anhydride, 725.2 parts by weight of phthalic anhydride, 546.4 parts by weight of 1,2-propanediol and 0.265 part by weight of hydroquinone, and having an acid number of 42), 240 parts by weight of styrene, 293 parts by weight of DDVP and 280 parts by weight of dioctyl phthalate.

The parts mentioned in the examples which follow denote parts by weight, unless stated otherwise.

EXAMPLE 1

53 parts of maleic anhydride were mixed into the abovementioned premix. After adding 26 parts of benzoyl peroxide in dimethyl phthalate plasticizer (50% strength) and 4 parts of a 10% strength solution of dimethylaniline in toluene, a 5 mm thick cast slab having a glass fiber content of about 30 percent by weight was produced by heating the mixture to 80° – 100°C for 30 minutes in a closed mold into which a glass fiber mat (600 g/m²) had been placed as a reinforcement. The slab was subsequently cut into moldings of size 10 × 20 cm.

EXAMPLE 2 (COMPARISON EXAMPLE)

A cast slab was produced according to Example 1 from the above-mentioned premix after addition of 26 parts of benzoyl peroxide in the phthalate plasticizer (50% strength) and 4 parts of a 10% strength solution of dimethylaniline in toluene, and the slab was subsequently cut into moldings of size 10 × 20 cm.

EXAMPLE 3 (COMPARISON EXAMPLE)

53 parts of maleic anhydride were mixed into the abovementioned premix. After adding 25 parts of a 40% strength solution of methyl ethyl ketone peroxide in dimethyl phthalate and 9 parts of a cobalt octoate solution in dioctyl phthalate (1 percent by weight of cobalt), a cast slab was manufactured according to Example 1 and was subsequently cut into moldings of size 10 × 20 cm.

EXAMPLE 4 (COMPARISON EXAMPLE)

A cast slab was produced according to Example 1 from the above-mentioned premix, after addition of 25 parts of a 40% strength solution of methyl ethyl ketone peroxide in dimethyl phthalate and 9 parts of a cobalt octoate solution (1 percent by weight of cobalt) in dioctyl phthalate, and the slab was subsequently cut into moldings of size 10 × 20 cm.

The intrinsic odor of the four different moldings was assessed organoleptically by 17 persons as follows:

| Moldings | Odour during the first days of use |
| --- | --- |
| Example 1 | slight, barely perceptible |
| Example 2 (comparison example) | objectionable, distinct odor of styrene |
| Example 3 (comparison example) | unpleasant, noticeable |
| Example 4 (comparison example) | penetrating, pungent |

For Examples 5 and 6 which follow, a 65% strength solution of an unsaturated polyester in styrene (which was produced by polycondensation of 517 parts of maleic anhydride, 1.805 parts of phthalic anhydride, 1.044 parts of 1,2-propanediol and 605 parts of dipropylene glycol) was used, the solution being stabilized with 0.271 part of hydroquinone.

EXAMPLE 5

A homogeneous mixture was produced from 182.5 parts of the above-mentioned polyester solution, 100 parts of DDVP, 62.5 parts of alkylsulfonic acid ester, 7.35 parts of maleic anhydride and 11.1 parts of benzoyl peroxide (50% strength in the phthalate plasticizer). Using 136.5 parts of a glass fiber mat (600 g/m²) a cast slab, the odor of which after cooling was barely perceptible, was produced therefrom according to Example 1. The slab was cut into moldings of size 8 × 25 cm.

EXAMPLE 6 (COMPARISON EXAMPLE)

A homogeneous mixture was produced from 174.9 parts of the above-mentioned polyester solution, 100 parts of DDVP, 60 parts of alkylsulfonic acid ester, 10 parts of methyl ethyl ketone peroxide (50% strength in dimethyl phthalate) and 5 parts of cobalt naphthenate solution (1% by weight of cobalt). A cast slab, the odor of which, after cooling, was penetratingly pungent, was produced therefrom, according to Example 1, using 150 parts of a glass fiber mat (600 g/m²). The slab was cut into moldings of size 8 × 25 cm.

BIOLOGICAL COMPARISON EXPERIMENT

One molding according to Example 5 and one molding according to Example 6 were suspended from the ceiling in the same manner in respective, equal-sized rooms of 40 m³ capacity. Directly after the moldings had been suspended, and after 1, 2, 7, 21, 28, 35, 42, 56 and 70 days, 200 flies of the variety *Musca domestica* were exposed in each of the rooms and 1, 2 and 3 hours after exposure of the test insects, the percentage of flies which had suffered knockdown was determined.

As is shown by the results in the table which follows, the two moldings had an insecticidal action of equal duration. However, whereas the molding according to Example 6 diffused an unpleasant odor in the room a few days after being suspended, such an odor did not emanate from the molding according to Example 5.

Table

| Molding according to | Period of action on the flies, in hours: | % knock-down after suspending the moldings for (days): | | | | | | | |
|---|---|---|---|---|---|---|---|---|---|
| | | 1 | 2 | 7 | 14 | 21 | 35 | 42 | 56 | 70 |
| Example 5 (according to the invention) | 1 | 5 | 90 | 80 | 90 | 90 | 80 | 80 | 50 | 40 |
| | 2 | 95 | 100 | 100 | 100 | 100 | 100 | 100 | 90 | 75 |
| | 3 | 100 | | | | | | | 100 | 100 |
| Example 6 (known) | 1 | 5 | 90 | 80 | 90 | 90 | 80 | 75 | 50 | 35 |
| | 2 | 90 | 100 | 100 | 100 | 100 | 100 | 100 | 95 | 70 |
| | 3 | 100 | | | | | | | 100 | 100 |

It will be appreciated that the instant specification and examples are set forth by way of illustration and not limitation, and that various modifications and changes may be made without departing from the spirit and scope of the present invention.

What is claimed is:

1. A method of diminishing the initially objectionable odor of an insecticidal composition comprising 0,0-dimethyl-0-(2,2-dichlorovinyl)-phosphate, an ethylenically unsaturated polyester, a vinyl monomer copolymerizable with the polyester, and at least one solid or liquid filler, comprising incorporating in the composition prior to curing about 0.1 to 10% by weight of the composition of an ethylenically unsaturated compound of the formula

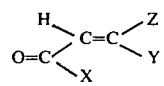

in which

X is —OR or —OH, Y is —H and Z is —COOR, or

X is —OH, Y is —COOR and Z is —H, or

X is —O— or <N—R, Y is <CO and Z is —H, in which case X and Y are bonded together to form an anhydride or imide ring, and R is an aliphatic radical with up to 12 carbon atoms.

2. The method according to claim 1, in which the ratio of the ethylenically unsaturated polyester to the vinyl monomer is about 40:60 to 90:10 by weight.

3. The method according to claim 1, in which the ratio of 0,0-dimethyl-0-(2,2-dichlorovinyl)phosphate to the total mixture of ethylenically unsaturated polyester and vinyl monomer is about 1:4 to 2:1 by weight.

4. The method according to claim 1, in which the total amount of filler constitutes about 10 to 50 percent by weight.

5. The method according to claim 1, in which the ethylenically unsaturated polyester is the polycondensation product of a polyhydric alcohol and an α, β-ethylenically unsaturated dicarboxylic acid or its anhydride optionally admixed with an aliphatic, cycloaliphatic or aromatic dicarboxylic acid or its anhydride, the copolymerizable vinyl monomer is a vinyl-aromatic compound, the ratio of 0,0-dimethyl-0-(2,2-dichlorovinyl) phosphate to the total mixture of ethylenically unsaturated polyester and vinyl monomer is about 1:3 to 1:1 by weight, and the unsaturated compound constitutes about 0.5 to 5 percent by weight of the mixture.

6. The method according to claim 1, wherein there is also incorporated in the composition a peroxide of the formula

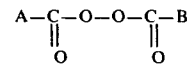

in which

A and B each is alkyl, aryl, aralkyl, alkoxy or aryloxy of 6 to 12 carbon atoms.

7. The method according to claim 6, wherein a curing accelerator is also incorporated in the composition.

8. The method according to claim 7, in which the accelerator is a dialkylarylamine.

9. The method according to claim 6, in which styrene is the copolymerizable vinyl monomer, maleic anhydride is the unsaturated compound and benzoyl peroxide is the peroxide.

10. The method according to claim 2, in which the ratio of 0,0-dimethyl-0-(2,2-dichlorovinyl)phosphate to the total mixture of ethylenically unsaturated polyester and vinyl monomer is about 1:4 to 2:1 by weight, and the total amount of filler constitutes about 10 to 50 percent by weight.

* * * * *